US008044988B2

(12) United States Patent
Peters et al.

(10) Patent No.: US 8,044,988 B2

(45) Date of Patent: Oct. 25, 2011

(54) SPRING CLIP

(75) Inventors: Danny Wayne Peters, Lexington, KY (US); Louis Anthony Wantland, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 970 days.

(21) Appl. No.: 11/782,231

(22) Filed: Jul. 24, 2007

(65) Prior Publication Data

US 2009/0027478 A1 Jan. 29, 2009

(51) Int. Cl.

| | |
|---|---|
| ***B41J 27/00*** | (2006.01) |
| ***B41J 15/14*** | (2006.01) |
| ***G02B 7/182*** | (2006.01) |
| ***A47F 7/14*** | (2006.01) |
| ***A47G 1/16*** | (2006.01) |
| ***A47G 1/04*** | (2006.01) |
| ***B60R 1/02*** | (2006.01) |

(52) U.S. Cl. ........ 347/257; 347/242; 359/871; 359/872; 248/475.1; 248/488

(58) Field of Classification Search .................. 347/255
See application file for complete search history.

(56) References Cited

U.S. PATENT DOCUMENTS

| | | | | |
|---|---|---|---|---|
| 5,737,346 | A | 4/1998 | Stenstrom | |
| 6,490,072 | B2 * | 12/2002 | Chee | 359/198.1 |
| 6,582,089 | B2 | 6/2003 | Chee | |
| 6,671,107 | B2 | 12/2003 | Chee | |
| 7,161,638 | B2 | 1/2007 | Lowe | |
| 7,453,487 | B2 * | 11/2008 | Sato et al. | 347/257 |
| 2002/0093715 | A1 | 7/2002 | Chee | |

* cited by examiner

*Primary Examiner* — Uyen Chau N Le
*Assistant Examiner* — John M Bedtelyon

(57) ABSTRACT

A method and apparatus for attaching a mirror to a housing with a spring clip such that the spring clip applies a substantially constant force to the mirror when a fastener for attaching the spring clip to a mounting structure of the housing has an axis defining an angle with a surface of the mounting structure that is within a predetermined range of angles. An arched contact surface with an aperture for receiving the fastener is provided on the spring clip such that the fastener contacts the contact surface tangentially.

14 Claims, 4 Drawing Sheets

SPRING CLIP

FIELD OF THE INVENTION

The present invention relates to a method and apparatus for retaining a mirror to a housing with a spring clip.

BACKGROUND OF THE INVENTION

Optical systems used in color laser printers may be characterized as having three sub-systems or assemblies, namely, a laser diode/pre-scan optical assembly, a scanning assembly, and a post scan assembly. Conventionally, four laser diodes generate separate laser beams corresponding, for example, to the colors yellow, cyan, magenta and black. In the pre-scan optical assembly, the individual beams are collimated and directed onto a rotating polygonal mirror in the scanning assembly. The facets of the rotating mirror sweep the individual beams across the surfaces of a plurality of mirrors and through lenses within the post scan assembly. The beams then scan along surfaces of four photoconductive drums within the printer. The mirrors in the post scan assembly are mounted to surfaces on the printhead housing via two spring clips positioned near opposite ends of the mirrors.

It is desirable to provide spring clips for applying a uniform mirror retaining force. It is further desirable to use a single spring clip to retain two or more mirrors in the post scan assembly, wherein the two or more mirrors are mounted at different angles.

SUMMARY OF THE INVENTION

In accordance with a first aspect of the present invention, a spring clip is provided for retaining a mirror to a first mounting structure of a housing when a fastener for fastening the spring clip to a second mounting structure of the housing has an axis defining an angle with a surface of the second mounting structure that is within a predetermined range of angles. The spring clip may comprise: a first section to apply a retaining force against the mirror and an arcuate second section coupled to the first section including an aperture for receiving the fastener. The fastener is capable of contacting the arcuate second section at a location such that the retaining force applied by the first section upon the mirror remains substantially constant when the angle defined by the axis of the fastener and the second mounting structure is within the predetermined range.

The arcuate second section may further comprise an arched contact surface positioned such that the fastener contacts the arched contact surface tangentially.

The second mounting structure may comprise an arcuate ridge and the arcuate second section may be shaped to receive the arcuate ridge of the second mounting structure so that rotation of the spring clip about the fastener is prevented when the fastener is rotated.

The first section may comprise a protrusion adapted to contact a center section of the mirror.

The protrusion may comprise a second arcuate ridge.

The spring clip may comprise a substantially planar third section coupled to the second section on a side of the second section opposite a side coupled to the first section. The fastener may not contact the third section when the angle defined by the axis of the fastener and the second mounting surface is within the predetermined range.

The first section may comprise a first part and a second part extending at an angle to the first part.

In accordance with a second aspect of the present invention, a printhead for a laser printer is provided. The printhead may comprise: a mirror, a spring clip, a housing having a first mounting structure to receive the mirror and a second mounting structure to receive the spring clip, and a fastener to couple the spring clip to the second mounting structure such that the spring clip retains the mirror to the first mounting structure. The spring clip may apply a substantially constant retaining force to the mirror when an angle defined by the axis of the fastener and the second mounting structure is within a predetermined range.

The spring clip may comprise a first section to apply a retaining force against the mirror and an arcuate second section coupled to the first section including an aperture for receiving the fastener. The fastener may contact the arcuate second section at a location such that the retaining force applied by the first section against the mirror remains substantially constant when the angle defined by the axis of the fastener and the second mounting structure is within the predetermined range.

In accordance with a third aspect of the present invention, a method of retaining a mirror to a housing with a spring clip is provided. The method may comprise: defining the housing to comprise a first mounting structure to receive the mirror and a second mounting structure to receive the spring clip; defining the spring clip to comprise a first section to apply a retaining force against the mirror and an arcuate second section coupled to the first section including an aperture for receiving a fastener; passing the fastener though the aperture in the spring clip second section; and engaging the fastener with the housing second mounting structure to attach the spring clip to the second mounting structure. The fastener may contact the arcuate second section at a location such that the retaining force applied by the first section upon the mirror remains substantially constant when an angle defined by the axis of the fastener and the second mounting structure is within a predetermined range.

Defining a spring clip may further comprise providing an arched contact surface positioned such that the fastener contacts the arched contact surface tangentially.

The second mounting structure may comprise an arcuate ridge and the arcuate second section may be shaped to receive the arcuate ridge of the second mounting structure such that rotation of the spring clip about the fastener is prevented when the fastener is rotated.

Defining a spring clip may further comprise providing a substantially planar third section coupled to the second section on a side of the second section opposite to a side coupled to the first section.

BRIEF DESCRIPTION OF THE DRAWINGS

The following detailed description of the preferred embodiments of the present invention can best be understood when read in conjunction with the following drawings, where like structure is indicated with like reference numerals, and in which.

DETAILED DESCRIPTION OF INVENTION

In the following detailed description of the preferred embodiments, reference is made to the accompanying drawings that form a part thereof, and in which is shown by way of illustration, and not by way of limitation, specific preferred embodiments in which the invention may be practiced. It is understood that other embodiments may be utilized and that changes may be made without departing from the spirit and scope of the present invention.

Figure 1:
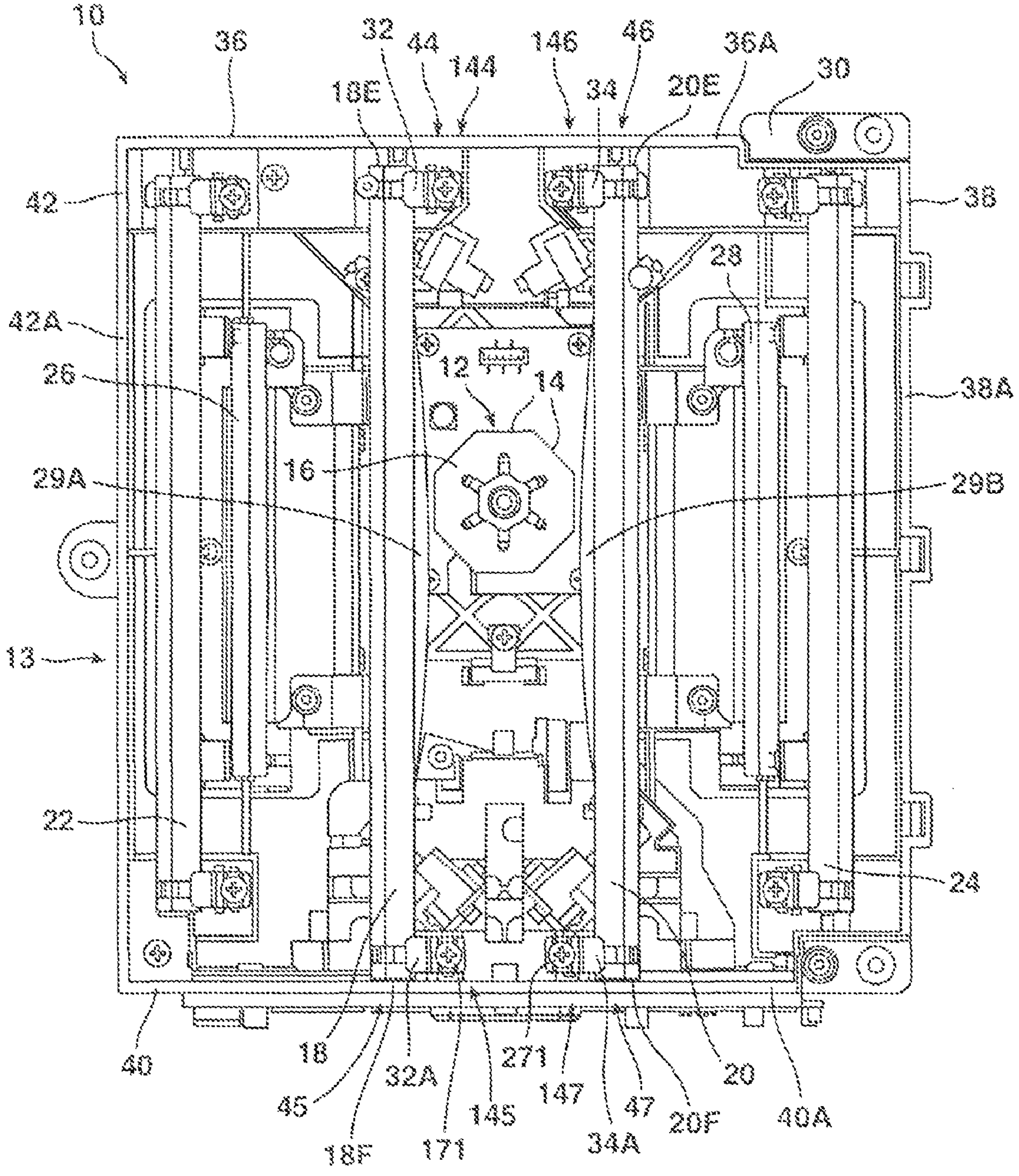
FIG. 1 is a plan view of a printhead for use in a color laser printer showing a scanning assembly and a post scan assembly taken from the post scan side.

Referring now to FIG. 1, a printhead, indicated generally by reference numeral 10, for use in a color laser printer, is shown. The printhead includes a housing 30 containing first, second, third and fourth laser diode/pre-scan assemblies (not shown), a scanning assembly 12, and a post scan assembly 13, see FIG. 1. In the illustrated embodiment of the present invention, first, second, third and fourth laser diodes (not shown) forming part of the first, second, third and fourth laser diode/pre-scan assemblies generate separate laser beams (not shown) corresponding, for example, to the colors yellow, cyan, magenta, and black. The individual laser beams are collimated in first, second, third and fourth pre-scan assemblies forming part of the laser diode/pre-scan assemblies and directed onto facets 14 of a rotating polygonal mirror 16 defining the scanning assembly 12. As the mirror 16 rotates, it causes the laser beams to move along the surfaces of first, second, third, fourth, fifth and sixth stationary linear mirrors 18, 20, 22, 24, 26 and 28 and pass through a plurality of F-theta lenses 29A and 29B. In the illustrated embodiment, each beam passes through only one of the F-theta lens 29A and 29B. The mirrors 18, 20, 22, 24, 26 and 28 and the F-theta lenses 29A and 29B define the post scan assembly 13. The beams subsequently exit the printhead housing 30 through corresponding first, second, third and fourth slots or windows (not shown) and scan along first, second, third and fourth photoconductive drums (not shown) within the laser printer.

In the illustrated embodiment, the first, second, third, fourth, fifth and sixth mirrors 18, 20, 22, 24, 26 and 28 are retained against respective mounting structures on the printhead housing 30 using spring clips.

Figure 2:
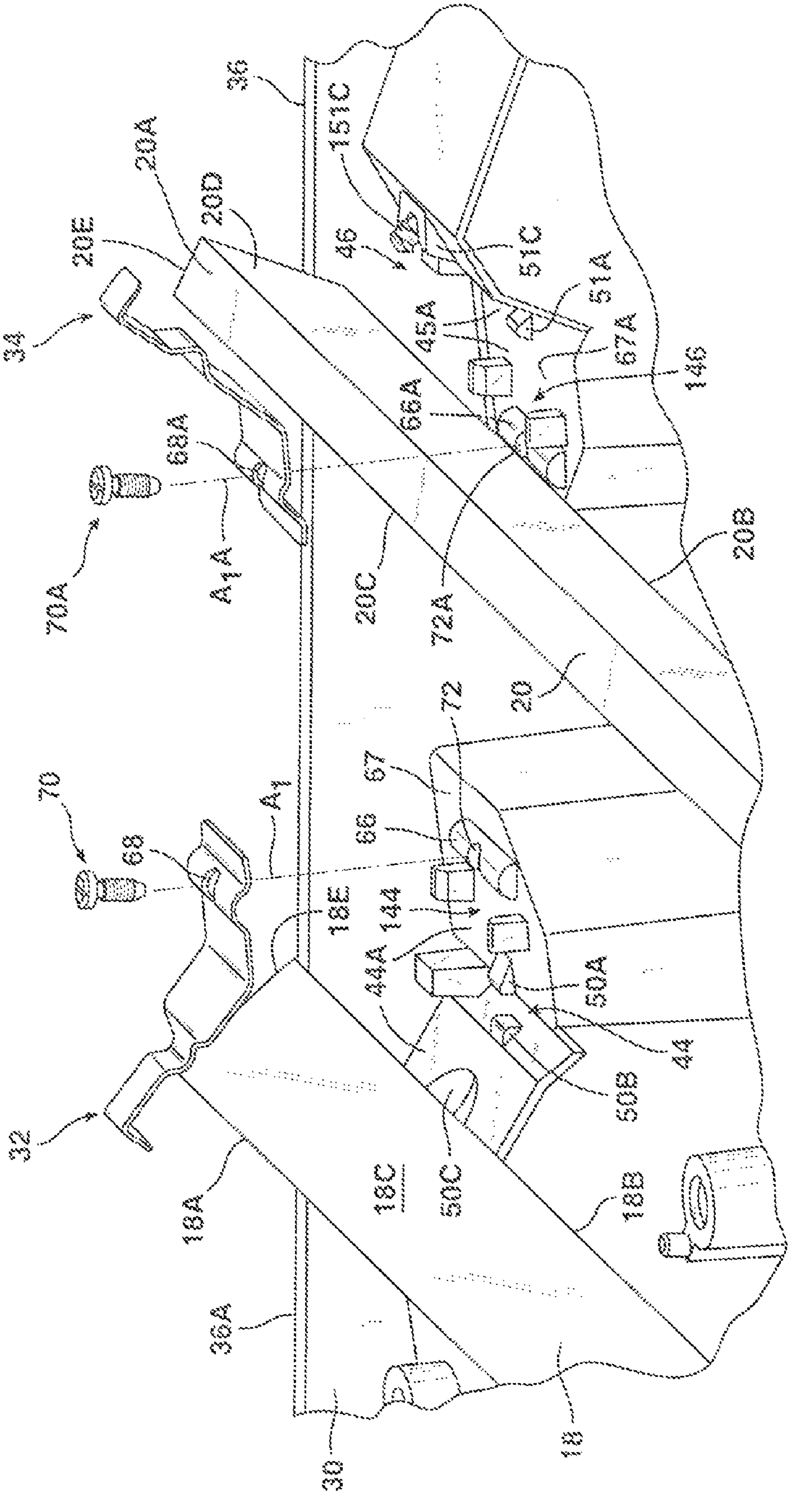
FIG. 2 is a perspective view of a part of the printhead housing showing mirrors, mounting structures, spring clips and fasteners.

For simplicity and clarity, discussion herein will refer specifically to the first and second mirrors 18 and 20 retained by first and second spring clips 32 and 32A and third and fourth spring clips 34 and 34A, respectively, see FIGS. 1 and 2 where spring clips 32A and 34A are shown in FIG. 1 only. It is understood that the concepts and principles of the present invention apply equally well to the spring clips used to retain each of the other mirrors 22, 24, 26 and 28.

Referring now to FIGS. 1 and 2, the printhead housing 30 of the illustrated embodiment has a first side 36 having an edge 36A, a second side 38 having an edge 38A, a third side 40 having an edge 40A and a fourth side 42 having an edge 42A. The edges 36A, 38A, 40A and 42A define a printhead mounting surface plane, see FIG. 1.

Figure 3:
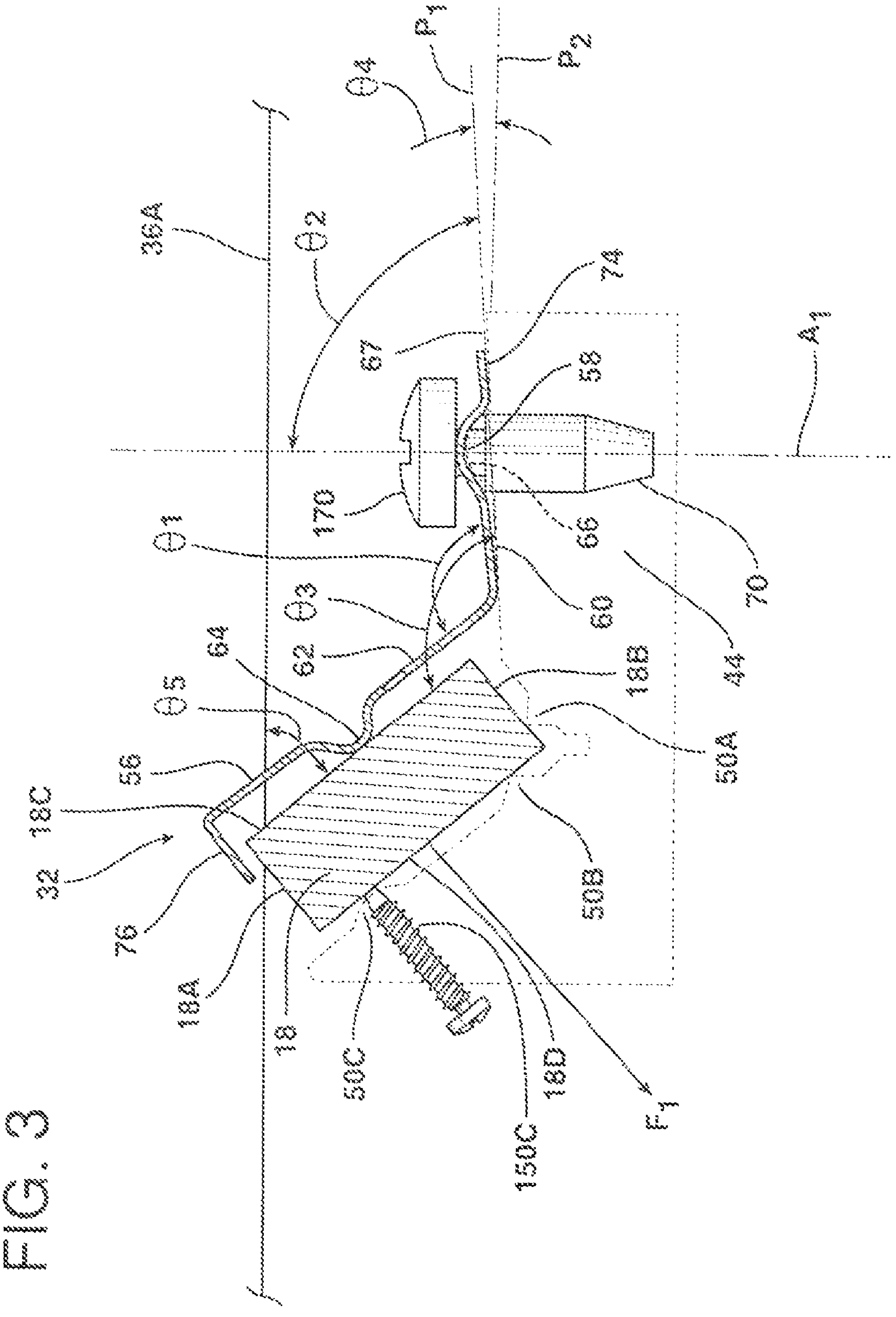
FIG. 3 is a diagrammatic view of a first mirror, spring clip and fastener of FIG. 2 showing the mirror in a first position in the printhead housing.

The first mirror 18 comprises first and second side surfaces 18A and 18B, front and rear surfaces 18C and 18D and first and second ends 18E and 18F, see FIGS. 1-3. The second mirror 20 comprises first and second side surfaces 20A and 20B, front and rear surfaces 20C and 20D and first and second ends 20E and 20F, see FIGS. 1, 2 and 4. The printhead housing 30 further comprises first and second mirror mounting structures 44 and 45 for mounting the first mirror 18 and third and fourth mirror mounting structures 46 and 47 for mounting the second mirror 20, see FIG. 1. The first mirror mounting structure 44 is located near the first end 18E of the first mirror 18, the second mirror mounting structure 45 is located near the second end 18F of the first mirror 18, the third mirror mounting structure 46 is located near the first end 20E of the second mirror 20 and the fourth mirror mounting structure 47 is located near the second end 20F of the second mirror 20, see FIG. 1.

The first mirror mounting structure 44 comprises a base portion 44A and first, second and third mounting features 50A, 50B and 50C, which extend out from the base portion 44A, see FIGS. 2 and 3. The first mounting feature 50A engages the second side surface 18B of the mirror 18. The second mounting feature 50B engages a lower portion of the rear surface 18D of the first mirror 18 near the second side surface 18B. An end of a screw 150C extends out from the third mounting feature 50C and engages the rear surface 18D of the first mirror 18 near its first side surface 18A, see FIG. 3. The first and second mounting features 50A and 50B and the screw 150C extending out of the third mounting feature 50C locate the first mirror 18 within the printhead housing 30 such that the first mirror front surface 18C is located at a desired angle $\theta_5$ relative to the edge 36A of the printhead housing first side 36 and the printhead mounting surface plane, see FIG. 2. The screw 150C extending through the third mounting feature 50C may be rotated during manufacturing to adjust the angular position of the first mirror 18 relative to the first and second mirror mounting structures 44 and 45 such that a corresponding laser beam moving along the mirror 18 strikes a corresponding PC drum at a desired location. It is noted that the third mounting feature 50C may not include a screw extending through it but may contact the first mirror rear surface 18D directly.

The second mirror mounting structure 45 is similar to the first mirror mounting structure and comprises first, second and third mounting features (not shown) extending from a base portion (not shown). The first and second mounting features are sized and shaped in a similar manner to the first and second mounting features 50A and 50B of the first mirror mounting structure 44. The third mounting feature of the second mirror mounting structure 45 may differ from the third mounting feature 50C of the first mirror mounting structure 44 as the third mounting feature of the second mirror mounting structure 45 may not include a screw extending through it and may contact the first mirror rear surface 18D directly.

Figure 4:
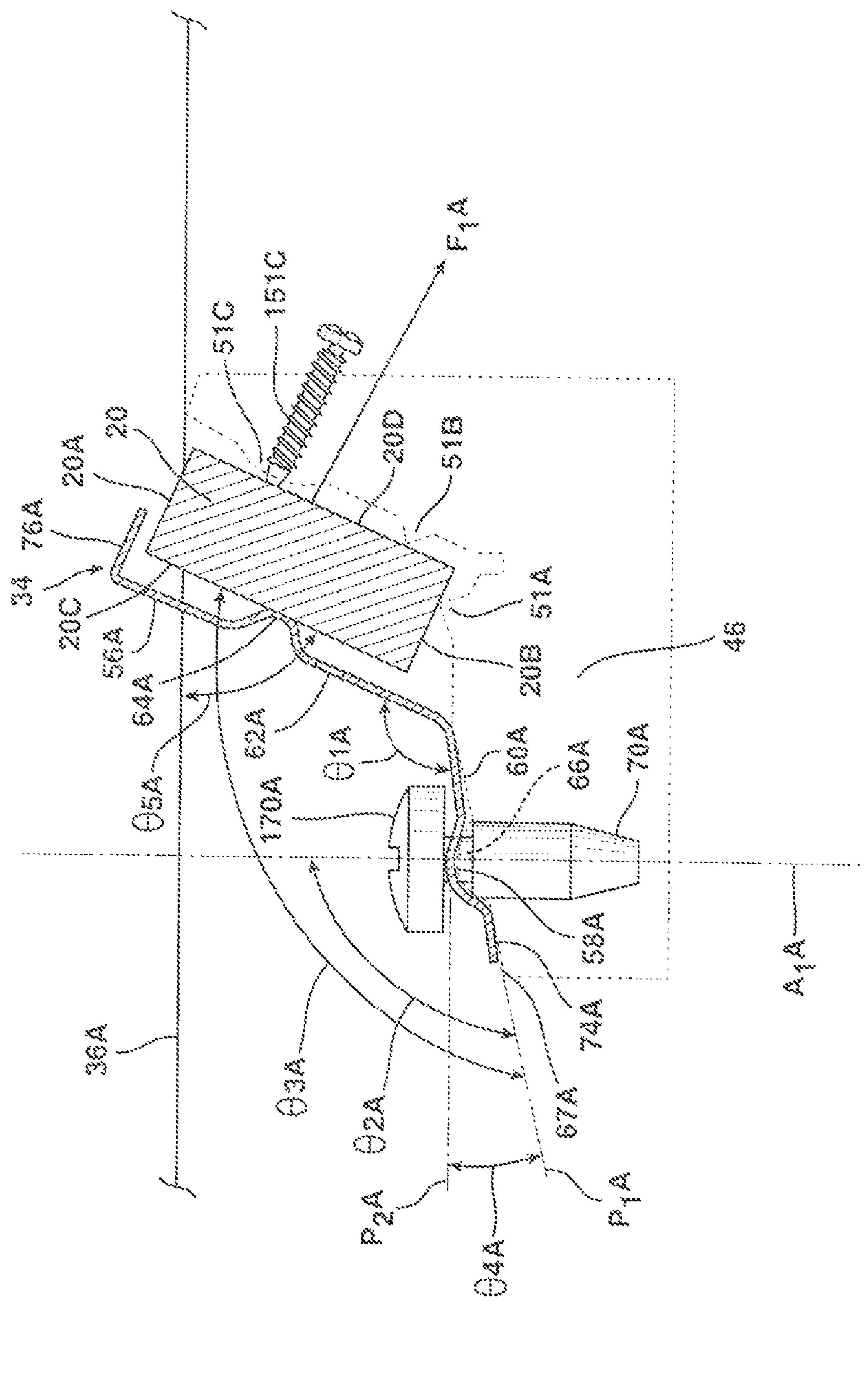
FIG. 4 is a diagrammatic view of a second mirror, spring clip and fastener of FIG. 2 showing the mirror in a second position in the printhead housing.

The third mirror mounting structure 46 comprises a base portion 45A and first, second and third mounting features 51A, 51B and 51C, which extend out from the base portion 45A, see FIGS. 2 and 4. The first mounting feature 51A engages the second side surface 20B of the second mirror 20. The second mounting feature 51B engages a lower portion of the rear surface 20D of the second mirror 20 near the second side surface 20B. An end of a screw 151C extends out from the third mounting feature 51C and engages the rear surface 20D of the second mirror 20 near its first side surface 20A, see FIG. 3. The first and second mounting features 51A and 51B and the screw extending out of the third mounting feature 51C locate the second mirror 20 within the printhead housing 30 such that the second mirror front surface 20C is located at a desired angle $\theta_{5A}$ relative to the edge 36A of the printhead housing first side 36 and the printhead mounting surface plane, see FIG. 2. The screw extending through the third mounting feature 51C may be rotated during manufacturing to adjust the angular position of the second mirror 20 relative to the third and fourth mirror mounting structures 46 and 47 such that a corresponding laser beam moving along the mirror 20 strikes a corresponding PC drum at a desired location. It is noted that the third mounting feature 51C may not include a screw extending through it.

The fourth mirror mounting structure 47 is similar to the third mirror mounting structure and comprises first, second and third mounting features extending from a base portion. The first and second mounting features are sized and shaped in a similar manner to the first and second mounting features 51A and 51B of the third mirror mounting structure 46. The third mounting feature of the fourth mirror mounting structure 47 may differ from the third mounting feature 51C of the third mirror mounting structure 46 as the third mounting feature of the fourth mirror mounting structure 47 may not include a screw extending through it.

Referring again to FIGS. 1 and 2, the printhead housing 30 may be made from a material such as a glass filled plastic, one of which is sold under the product designation NORYL 5246, from General Electric Plastics, and may be formed by processes such as die casting or injection molding. As is well known to those skilled in the art, it is customary to use multiple part molds that can be separated to remove finished parts from the mold once the parts have solidified. Commonly, two-part molds are used in order to minimize tooling costs. Such two-part molds may be separated in a single direction only.

The printhead housing 30 in the illustrated embodiment may be formed in a two-part mold of this type having a mold separation direction, commonly called a mold pull direction, perpendicular to the printhead mounting surface plane previously defined. As is also well known to those skilled in the die casting and injection molding arts, structures made by these processes may have features such as protrusions and voids defined by the mold extending only in a direction parallel to the mold pull direction.

Referring now to FIGS. 2 and 3, the first mirror front surface 18C is a reflecting surface against which a first laser beam (not shown) is directed. The first mirror rear surface 18D defines a first mounting surface, which, as noted above, is positioned against the second mounting feature 50B and the screw 150C extending out of the third mounting feature 50C, while the first mirror second side surface 18B defines a second mounting surface, which, as noted above, is positioned against the first mounting feature 50A. The first spring clip 32 is configured to apply a retaining force in a direction $F_1$ substantially perpendicular to the front surface 18C of the first mirror 18 in order to retain the first mirror 18 in place on the first and second mounting features 50A-50B and the screw 150C, see FIGS. 2 and 3. In a similar manner, the second spring clip 32A is configured to apply a retaining force to the front surface 18C of the first mirror 18 in order to retain the first mirror 18 in place on the first, second and third mounting features of the second mirror mounting structure 45.

Referring now to FIGS. 2 and 4, the second mirror front surface 20C is a reflecting surface against which a second laser beam (not shown) is directed. The second mirror rear surface 20D defines a first mounting surface, which, as noted above, is positioned against the second mounting feature 51B and the screw 151C of the third mounting feature 51C, while the second mirror second side surface 20B defines a second mounting surface, which, as noted above, is positioned against the first mounting feature 51A. The third spring clip 34 is configured to apply a retaining force in direction $F_1$A substantially perpendicular to the front surface 20C of the second mirror 20 in order to retain the second mirror 20 in place on the first and second mounting features 51A-51B and the screw 151C. In a similar manner, the fourth spring clip 34A is configured to apply a retaining force to the front surface 20C of the second mirror 20 in order to retain the second mirror 20 in place on the first, second and third mounting features of the fourth mirror mounting structure 47.

It is desirable that each spring clip apply a substantially uniform retaining force against the surface of the mirror it contacts. It is further desirable that a single spring clip design suffice for use in retaining at least two mirrors positioned in the printhead housing 30 at different angles relative to the edges 36A, 38A, 40A and 42A and the printhead mounting surface plane. It is yet further desirable that protrusions forming part of and voids formed within the printhead housing 30 be oriented perpendicular to the printhead mounting surface plane previously defined so that the printhead housing 30 may be formed in the type of two-part mold previously discussed. Hence, longitudinal axes of the printhead housing protrusions and voids are generally parallel to the single separation or pull direction of the mold parts.

Referring now to FIG. 3, the first spring clip 32 comprises a first section 56 for applying the retaining force in the direction $F_1$, noted above, and an arcuate-shaped second section 58. The printhead housing 30 further comprises a first spring-clip mounting structure 144, which is positioned adjacent to the first mirror mounting structure 44, see FIG. 2. The first spring-clip mounting structure 144 comprises an arcuate-shaped mounting feature 66 and an adjacent substantially planar surface 67, see FIGS. 2 and 3. The mounting feature 66 is received in the arcuate-shaped second section 58 of the first spring clip 32.

In the illustrated embodiment, the first section 56 of the first spring clip 32 comprises a substantially planar first part 60 and a second part 62, integral with the first part 60 and extending at an angle $\Theta_1$ to the first part 60. The angle $\Theta_1$ may be approximately 135 degrees. The first section 56 further comprises an arcuate-shaped protrusion 64 extending in the direction $F_1$ and configured to contact a center portion of the front surface 18C of the first mirror 18.

The arcuate-shaped second section 58 of the first spring clip 32 includes an aperture 68, see FIG. 2, for receiving a fastener 70, a screw in the illustrated embodiment, to couple the spring clip 32 to the mounting feature 66 of the first spring clip mounting structure 144, see FIGS. 2 and 3. The fastener 70 extends through the aperture 68 in the first spring clip second section 58 and further into a bore 72 in the mounting feature 66 of the first spring-clip mounting structure 144, see FIG. 2. The bore 72 may be defined during forming of the printhead housing by a feature (not shown) on a two-part mold. As a result, an axis $A_1$ of the bore 72 is parallel to the pull direction of the mold, which is perpendicular to the printhead housing side edges 36A, 38A, 40A and 42A and the printhead mounting surface plane.

Referring again to FIG. 3, the spring clip 32 in the illustrated embodiment further comprises a substantially planar third section 74 integral with the second section 58. The third section 74 is positioned adjacent to and substantially parallel with a plane $P_1$ defined by the substantially planar surface 67 of the first spring clip mounting structure 144, see FIGS. 2 and 3. The third section 74 may be substantially planar with the first part 60 of the spring clip first section 56. A fourth substantially planar section 76 of the first spring clip 32 is integral with and substantially perpendicular to the first section second part 62. In other embodiments of the present invention, a fourth section may not be provided or, if provided, the fourth section 76 may not be planar and/or may extend at other angles relative to the first section 56.

As noted above, the axis $A_1$ of the bore 72 in the mounting feature 66 of the first spring clip mounting structure 144 is perpendicular to the printhead housing side edge 36A and the printhead mounting surface plane. Further in the illustrated embodiment, the axis $A_1$ of the bore 72 is positioned at an angle $\theta_2$ of about 87 degrees relative to the plane $P_1$ defined by the surface 67 of the first spring clip mounting structure 144, see FIG. 2. An angle $\theta_3$ between the first mirror front surface 18C and the plane $P_1$ of the surface 67 of the first spring clip mounting structure 144 is about 122.25 degrees. An angle $\theta_4$ between the plane $P_1$ and a plane $P_2$ parallel with the edge 36A of the printhead housing first side 36 is about 3 degrees. The angle $\theta_5$, noted above, between the first mirror front surface 18C and the edge 36A of the printhead housing first side 36 is about 50 degrees.

The printhead housing 30 further comprises a second spring-clip mounting structure 145, which is positioned adjacent to the second mirror mounting structure 45, see FIG. 1. The second spring-clip mounting structure 145 is configured in the same manner as the first spring-clip mounting structure 144 and comprises an arcuate-shaped mounting feature (not shown) and an adjacent substantially planar surface (not shown). The second spring clip 45 is identical to the first spring clip 44. Further, the second spring clip 45 is mounted to the second spring-clip mounting structure 145 via a screw 171, see FIG. 1, in the same manner that the first spring clip 44 is mounted to the first spring-clip mounting structure 144 via the screw 70.

Referring now to FIGS. 2 and 4, the third spring clip 34 is identical to the first and second spring clips 32, 32A previously discussed. The third spring clip 34 comprises a first section 56A for applying a retaining force in a direction $F_1A$ substantially perpendicular to the front surface 20C of the second mirror 20, see FIG. 4. The third spring clip 34 further comprises an arcuate-shaped second section 58A. The printhead housing 30 further comprises a third spring-clip mounting structure 146, which is positioned adjacent to the third mirror mounting structure 46, see FIG. 2. The third spring-clip mounting structure 146 comprises an arcuate shaped mounting feature 66A and an adjacent substantially planar surface 67A, see FIGS. 2 and 4. The mounting feature 66A is received in the arcuate-shaped second section 58A of the third spring clip 34.

In the illustrated embodiment, the first section 56A of the third spring clip 34 comprises a substantially planar first part 60A and a second part 62A, integral with first part 60A and extending at an angle $\Theta_{1A}$ to the first part 60A. The angle $\Theta_{1A}$ is identical to the angle $\Theta_1$ of the spring clip 32, see FIGS. 3 and 4. The first section 56A further comprises an arcuate-shaped protrusion 64A extending in the direction $F_{1A}$ and configured to contact a center portion of the front surface 20C of the second mirror 20.

The arcuate-shaped second section 58A of the third spring clip 34 includes an aperture 68A, see FIG. 2, for receiving a fastener 70A, a screw in the illustrated embodiment, to couple the spring clip 34 to the mounting feature 66A of the third spring-clip mounting structure 146, see FIGS. 2 and 4. The fastener 70A extends through the aperture 68A and further into a bore 72A in the mounting feature 66A of the third spring-clip mounting structure 146, see FIG. 2. The bore 72 may be defined during forming of the printhead housing by a feature (not shown) of a two-part mold as previously discussed. As a result, an axis of the bore $A_{1A}$ is preferably parallel to the pull direction of the mold, which is perpendicular to the printhead housing side edges 36A, 38A, 40A and 42A and the printhead mounting surface plane.

Referring again to FIG. 4, the spring clip 34 in the illustrated embodiment further comprises a substantially planar third section 74A integral with the second section 58A. The third section 74A is positioned adjacent to and substantially parallel with a plane $P_{1A}$ defined by the substantially planar surface 67A of the third spring-clip mounting structure 146, see FIGS. 2 and 4. The third section 74A may be substantially planar with the first part 60A of the spring clip first section 56A. A fourth substantially planar section 76A is integral with and substantially perpendicular to the first section second part 62A. In other embodiments of the present invention, a fourth section may not be provided or, if provided, the fourth section 76A may not be planar and/or may extend at other angles relative to the first section 56A.

As noted above, the axis $A_{1A}$ of the bore 72A in the mounting feature 66A of the third spring clip mounting structure 146 is perpendicular to the printhead housing side edge 36A and the printhead mounting surface plane. In the illustrated embodiment, the axis $A_{1A}$ of the bore 72A is positioned at an angle $\theta_{2A}$ of about 97.25 degrees relative to the plane $P_{1A}$ defined by the surface 67A of the third spring clip mounting structure 146, see FIG. 4. An angle $\theta_{3A}$ between the third mirror front surface 20C and the plane $P_{1A}$ of the surface 67A of the third spring clip mounting structure 146 is about 122.25 degrees and is identical to the angle $\theta_3$ between the first mirror front surface 18C and the plane $P_1$ of the surface 67 of the first spring clip mounting structure 144. An angle $\theta_{4A}$ between the plane $P_{1A}$ and a plane $P_{2A}$ parallel with the edge 36A of the printhead housing first side 36 is about 7.25 degrees. The angle $\theta_{5A}$, noted above, between the second mirror front surface 20C and the edge 36A of the printhead housing first side 36 is about 65 degrees.

The printhead housing 30 further comprises a fourth spring-clip mounting structure 147, which is positioned adjacent to the fourth mirror mounting structure 47, see FIG. 1. The fourth spring-clip mounting structure 147 is configured in the same manner as the third spring-clip mounting structure 146 and comprises an arcuate-shaped mounting feature (not shown) and an adjacent substantially planar surface (not shown). The fourth spring clip 47 is identical to the first, second and third spring clips 44-46. Further, the fourth spring clip 47 is mounted to the fourth spring-clip mounting structure 147 via a screw 271, see FIG. 1, in the same manner that the third spring clip 46 is mounted to the third spring-clip mounting structure 146 via the screw 70A.

It is noted that the angle $\theta_5$ between the first mirror front surface 18C and the edge 36A of the printhead housing first side 36 differs from the angle $\theta_{5A}$ between the second mirror front surface 20C and the edge 36A of the printhead housing first side 36. It is also noted that the angle $\theta_2$ between the axis $A_1$ of the bore 72 in the mounting feature 66 of the first spring clip mounting structure 144 and the plane $P_1$ defined by the surface 67 of the first spring clip mounting structure 144 differs from the angle $\theta_{2A}$ between the axis $A_{1A}$ of the bore 72A in the mounting feature 66A of the third spring clip mounting structure 146 and the surface 67A of the third spring clip mounting structure 146. As noted above, both the bore 72 and the bore 72A have axes $A_1$ and $A_{1A}$ substantially perpendicular to the printhead housing side edge 36A and the printhead mounting surface plane. Even though angles $\theta_5$ and $\theta_{5A}$ are not equal to one another, the first, second, third and fourth clips 32, 32A, 34, 34A, which, as noted above, are identical to one another, can be used interchangeably to secure the first and second mirrors 18 and 20 to the first, second, third and fourth mirror mounting structures 44-47.

In order for the spring clip 32 to apply a retaining force against the front surface 18C of the first mirror 18 that is substantially equal to the retaining force applied by the spring clip 34 against the front surface 20C of the second mirror 20, it is necessary that the angle $\Theta_1$ of the spring clip 32 be made approximately equal to the angle $\Theta_1A$ of the spring clip 34 and further, the length of the spring clip 32 from where its corresponding screw 70 contacts its corresponding arcuate-shaped second section 58 to where its corresponding arcuate-shaped protrusion 64 contacts the center portion of the front surface 18C of its corresponding mirror 18 must be substantially equal to the length of the spring clip 34 from where its corresponding screw 70A contacts its corresponding arcuate-shaped second section 58A to where its corresponding arcuate-shaped protrusion 64A contacts the center portion of the front surface 20C of its corresponding mirror 20, see FIGS. 3 and 4. This may be accomplished by defining the positions of the first, second and third mounting features 50A-50C of the first mirror mounting structure 44 as well as the first, second and third mounting features of the second mirror mounting structure 45 relative to the edge 36A of the printhead housing first side 36 such that the first mirror front side 18C is positioned at a desired angle $\theta_5$ relative to the edge 36A of the printhead housing first side 36. Thereafter, the surface 67 of the first spring clip mounting structure 144 as well as a corresponding surface of the second spring clip mounting structure 145 are defined such that when the spring clips 32, 32A are mounted to the spring-clip mounting structures 144, 145, the angle $\theta_3$ between the first mirror front surface 18C and the plane $P_1$ of the surface 67 of the first spring clip mounting structure 144 and a corresponding angle between the first mirror front surface 18C and a plane (not shown) of a corresponding surface of the second spring clip mounting structure 145 equal a desired first value. The desired value for the angle $\theta_3$ between the first mirror front surface 18C and the plane $P_1$ of the surface 67 of the first spring clip mounting structure 144 and a corresponding angle between the first mirror front surface 18C and a plane (not shown) of a corresponding surface of the second spring clip mounting structure 145 corresponds to the angle $\Theta_1$ of the first spring clip 32 as well as a corresponding angle of the second spring clip 32A equaling a second desired value.

Next, the positions of the first, second and third mounting features 51A-51C of the third mirror mounting structure 46 as well as the first, second and third mounting features of the fourth mirror mounting structure 47 are defined relative to the edge 36A of the printhead housing first side 36 such that the second mirror front side 20C is positioned at a desired angle $\theta_{5A}$ relative to the edge 36A of the printhead housing first side 36. Thereafter, the surface 67A of the third spring clip mounting structure 146 as well as a corresponding surface of the fourth spring clip mounting structure 147 are defined such that when the spring clips 34, 34A are mounted to the spring-clip mounting structures 146, 147, the angle $\theta_{3A}$ between the second mirror front surface 20C and the plane $P_{1A}$ of the surface 67A of the third spring clip mounting structure 146 and a corresponding angle between the second mirror front surface 20C and a plane (not shown) of a corresponding surface of the fourth spring clip mounting structure 147 equal the angle $\theta_3$ between the first mirror front surface 18C and the plane $P_1$ of the surface 67 of the first spring clip mounting structure 144. When the angle $\theta_{3A}$ is equal to angle $\theta_3$, the angle $\Theta_{1A}$ of the third spring clip 34 as well as a corresponding angle of the fourth spring clip 34A will equal the angle $\Theta_1$ of the first spring clip 32 as well as a corresponding angle of the second spring clip 32A.

It is also noted that because the second sections of the first, second, third and fourth springs clips 32, 32A, 34, 34A have an arcuate shape, the screws that couple the spring clips 32, 32A, 34, 34A to the first, second, third and fourth spring clip mounting structures 144, 145, 146, 147 only contact the arcuate-shaped second sections of the spring clips 32, 32A, 34, 34A and not an adjacent first section first part of the spring clip or an adjacent third section of the spring clip. For example, no part of the head 170 of the screw 70 makes contact with first section first part 60 of the first spring clip 32 or an adjacent third section 74 of the first spring clip 32, see FIG. 3. Also, no part of the head 170A of the screw 70A makes contact with first section first part 60A of the second spring clip 34 or an adjacent third section 74A of the third spring clip 34, see FIG. 4.

While the screws 70 and 70A make contact at slightly different angular locations on the arcuate-shaped second sections 58, 58A of the first and third spring clips 32, 34, the length of the spring clip 32 from where its corresponding screw 70 contacts its corresponding arcuate-shaped second section 58 to where its corresponding arcuate-shaped protrusion 64 contacts the center portion of the front surface 18C of its corresponding mirror 18 remains substantially equal to the length of the spring clip 34 from where its corresponding screw 70A contacts its corresponding arcuate-shaped second section 58A to where its corresponding arcuate-shaped protrusion 64A contacts the center portion of the front surface 20C of its corresponding mirror 20.

Hence, the first, second, third and fourth clips 32, 32A, 34, 34A are interchangeable and can be used to secure either the first mirror 18 or the second mirror 20 to the printhead housing 30 with substantially the same retaining force.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the invention.

What is claimed is:

1. A spring clip for retaining a mirror to a first mounting structure of a housing when a fastener for fastening said spring clip to a second mounting structure of the housing has an axis defining an angle with a surface of the second mounting structure that is within a predetermined range of angles comprising:

a first section to apply a retaining force against the mirror, comprising a substantially planar first part and a second part extending at an angle to said first part;

an arcuate second section coupled to said first part of said first section including an aperture for receiving the fastener, the fastener contacting said arcuate second section at a location such that said retaining force applied by said first section upon the mirror remains substantially constant when the angle defined by the axis of the fastener and the second mounting structure surface is within the predetermined range, the second section having an arcuate cross-section with concave top and bottom surfaces;

a substantially planar third section coupled to said second section on a side of said second section opposite a side coupled to said first section, said second section being disposed between said third section and said first part and protrudes therefrom in a direction not falling in a plane in which said third section is located and in which said first part is located, wherein said first part of said first section and said third section lie in the same plane.

2. The spring clip of claim 1, wherein said arcuate second section further comprises an arched contact surface positioned such that the fastener contacts said arched contact surface tangentially.

3. The spring clip of claim 1, wherein the second mounting structure comprises an arcuate ridge and said arcuate second section is shaped to receive the arcuate ridge of the second mounting structure such that rotation of said spring clip about the fastener is prevented when the fastener is rotated, said arcuate ridge having a convex outer surface with a radius that substantially matches a radius of said concave bottom surface of said second section such that said convex outer surface of said arcuate ridge substantially matches said concave bottom surface of said second section and engages therewith.

4. The spring clip of claim 1, wherein said first section comprises a protrusion adapted to contact a center section of the mirror.

5. The spring clip of claim 4, wherein said protrusion comprises a second arcuate ridge.

6. The spring clip of claim 1, wherein the fastener is not in contact with said third section when the angle defined by the axis of the fastener and the second mounting structure is within the predetermined range.

7. A printhead for a laser printer comprising:

a mirror;

a spring clip;

a housing having a first mounting structure to receive said mirror and a second mounting structure to receive said spring clip; and a fastener to couple said spring clip to said second mounting structure such that said spring clip retains said mirror to said first mounting structure, wherein said spring clip applies a substantially constant retaining force to said mirror when an angle defined by an axis of said fastener and said second mounting structure is within a predetermined range, wherein said spring clip comprises:

a first section to apply the retaining force against said mirror; and an arcuate second section coupled to said first section including an aperture for receiving said fastener, said fastener contacting said arcuate second section at a location such that the retaining force applied by said first section upon said mirror remains substantially constant when the angle defined by the axis of the fastener and the second mounting structure is within said predetermined range, wherein said second mounting structure comprises an arcuate ridge having a convex outer surface which substantially matches a concave under surface of said arcuate second section, a radius of said convex outer surface of said arcuate ridge substantially matching a radius of said concave under surface of said arcuate second section so that said arcuate second section receives said arcuate ridge when said second section is positioned over said arcuate ridge such that rotation of said spring clip about said fastener is prevented when said fastener is rotated.

8. The printhead of claim 7, wherein said arcuate second section further comprises an arched contact surface positioned such that said fastener contacts said arched contact surface tangentially.

9. The printhead of claim 7, wherein said first section comprises a protrusion adapted to contact said mirror only at a center section of said mirror.

10. The printhead of claim 9, wherein said protrusion comprises a second arcuate ridge.

11. The printhead of claim 7, wherein said spring clip further comprises a substantially planar third section coupled to said second section on a side of said second section opposite a side coupled to said first section, wherein said fastener is not in contact with said third section when said angle is within the predetermined range.

12. The printhead of claim 11, wherein said first section comprises a first part and a second part extending at an angle to said first part.

13. The printhead of claim 7, wherein said first section comprises a substantially planar first part and a second part extending at an angle to said first part, said spring clip further comprises a substantially planar third section coupled to said second section on a side of said second section opposite a side coupled to said first part of said first section, said second section being disposed between said third section and said first part and protrudes therefrom in a direction not falling in a plane in which said third section is located and not falling within a plane in which said first part is located.

14. The printhead of claim 13, wherein said substantially planar first part and said substantially planar third section being in the same plane.

* * * * *